(12) United States Patent
Nam et al.

(10) Patent No.: US 11,745,566 B2
(45) Date of Patent: Sep. 5, 2023

(54) WIRED POWER TRANSMISSION SYSTEM FOR SMART GLASS AND VEHICLE THEREOF

(71) Applicants: Hyundai Motor Company, Seoul (KR); Kia Corporation, Seoul (KR); Pyeong Hwa Automotive Co., Ltd., Daegu (KR)

(72) Inventors: Yong-Hyun Nam, Anyang-si (KR); Seung-Sik Han, Hwaseong-si (KR); Jae-Seung Lee, Hwaseong-si (KR); Dae-Hee Lee, Incheon (KR); Min-Jae Lee, Yongin-si (KR)

(73) Assignees: Hyundai Motor Company, Seoul (KR); Kia Corporation, Seoul (KR); Pyeong Hwa Automotive Co., Ltd., Daegu (KR)

( * ) Notice: Subject to any disclaimer, the term of this patent is extended or adjusted under 35 U.S.C. 154(b) by 1 day.

(21) Appl. No.: 17/355,567

(22) Filed: Jun. 23, 2021

(65) Prior Publication Data

US 2022/0297513 A1 Sep. 22, 2022

(30) Foreign Application Priority Data

Mar. 16, 2021 (KR) ..................... 10-2021-0034045

(51) Int. Cl.
*G02F 1/15* (2019.01)
*G02B 26/00* (2006.01)
(Continued)

(52) U.S. Cl.
CPC ................ *B60J 3/04* (2013.01); *G02F 1/163* (2013.01); *B60Y 2200/10* (2013.01)

(58) Field of Classification Search
CPC ...... G02F 1/155; G02F 1/1523; G02F 1/1525; G02F 1/1521; G02F 1/163; G02F 3/16;
(Continued)

(56) References Cited

U.S. PATENT DOCUMENTS 4,998,889 A * 3/1991 Moly ................... H01R 13/629
439/247
11,530,567 B2 * 12/2022 Nam ......................... B60J 1/17
(Continued)

FOREIGN PATENT DOCUMENTS

CN 107109892 A * 8/2017 ........... E06B 3/6722
CN 107884936 A * 4/2018
(Continued)

*Primary Examiner* — Dawayne Pinkney
(74) *Attorney, Agent, or Firm* — Slater Matsil, LLP

(57) ABSTRACT

An embodiment wired power transmission system for a smart glass includes a connector module including a power connector connected to a holder bracket configured to fix the smart glass, the connector module being configured to transmit power to the smart glass, an inverter configured to vary an applied voltage of the power to change the power or the voltage of the smart glass, and a cable module electrically connecting the power connector and the inverter through a power cable, the cable configured to maintain an electrical connection state by forming a tension of the power cable through an interval change between the connector module and the inverter.

20 Claims, 12 Drawing Sheets

(51) Int. Cl.
  *G02F 1/1503* (2019.01)
  *G09G 3/19* (2006.01)
  *F21V 14/00* (2018.01)
  *B60J 3/04* (2006.01)
  *G02F 1/163* (2006.01)

(58) Field of Classification Search
  CPC ........ G02F 1/1533; G02F 1/03; G02F 1/0316;
         C09K 9/02; B60R 1/088; H04N 9/3137;
                                    H04N 9/22
  USPC ........... 359/265–275, 277, 245–247; 345/49,
                              345/105, 107; 248/817; 438/929
  See application file for complete search history.

(56) References Cited

U.S. PATENT DOCUMENTS

2016/0357083 A1* 12/2016 Brown .................. H01R 41/00
2018/0090876 A1* 3/2018 Klein .................... H01R 43/26

FOREIGN PATENT DOCUMENTS

ES        2748056 T3 *  3/2020  ............... B60J 3/04
KR     20130037877 A    4/2013

* cited by examiner

<SECT A-A>

WIRED POWER TRANSMISSION SYSTEM FOR SMART GLASS AND VEHICLE THEREOF

CROSS-REFERENCE TO RELATED APPLICATIONS

This application claims the benefit of Korean Patent Application No. 10-2021-0034045, filed on Mar. 16, 2021, which application is hereby incorporated herein by reference.

TECHNICAL FIELD

Exemplary embodiments of the present disclosure relate to a wired power transmission system for a smart glass and a vehicle thereof.

BACKGROUND

Recently, by applying a smart glass to a vehicle door, a door window goes beyond simplicity and functions as the smart glass.

As an example, the smart glass changes the light transmittance through adjustment of a voltage being applied thereto, and thus adjusts the sunlight that disturbs driving or the headlight light of an opposite vehicle during the vehicle driving.

Accordingly, the smart glass requires a power supply for changing the light transmittance in accordance with an external environment, and for this, a wireless type smart glass power transmission system is applied to the vehicle. This is because the door glass is configured to perform only the ascending/descending movement through a cable interlocked in association with a motor being driven by an external power supply.

As an example, the smart glass wireless power transmission system includes a power reception module and a power transmission module which are built inside a door, and uses a magnetic induction method and a magnetic resonance method between a transmission coil (primary coil) of the power transmission module to which power supply is performed from a battery and the like and a reception coil (secondary coil) of the power reception module which supplies the power to the smart glass.

However, the smart glass wireless power transmission system has the following drawbacks in applicability to the door of the vehicle.

First, component parts for the wireless power transmission suffer an excessive cost increase. Second, power transmission/reception is not possible in a down state of the smart glass. Third, inline assembly through a vehicle assembly line is not possible due to the large size of the power transmission/reception system. Fourth, electromagnetic compatibility, which makes it difficult to apply the smart glass wireless power transmission system to the actual vehicle, is not satisfied.

In particular, since the existing door is configured to perform only the ascending/descending function of the door window through motor and cable connection, it is not possible to implement direct power transmission to the smart glass like the wireless power transmission.

The foregoing description of the background technology is intended merely to help the understanding of the background of the present disclosure, and is not intended to mean that the present disclosure falls within the purview of the related art that is already known to those of ordinary skill in the art to which the present disclosure pertains.

SUMMARY

Exemplary embodiments of the present disclosure relate to a wired power transmission system for a smart glass and a vehicle thereof. Particular embodiments relate to a vehicle that adopts a wired power transmission system for a smart glass, which is applied to a vehicle door and maintains a power supply line even in case of an ascending/descending movement of the smart glass.

Exemplary embodiments of the present disclosure overcome disadvantages, and an embodiment of the present disclosure provides a wired power transmission system for a smart glass and a vehicle thereof, which enable power transmission/reception in a down state of the smart glass by maintaining power supply to the smart glass through a wire length change whereby a power cable is wound or unwound to match ascending/descending movement of the smart glass in an inner space of a door, simply implement the watertight performance of a wet zone for the inner space of the door with a grommet by using, in particular, a door carrier panel provided in the inner space of the door, and enable inline assembly using a vehicle assembly line.

Other objects and advantages of embodiments of the present disclosure can be understood by the following description, and become apparent with reference to the embodiments of the present disclosure. Also, it is obvious to those skilled in the art to which the present disclosure pertains that the objects and advantages of embodiments of the present disclosure can be realized by the means as claimed and combinations thereof.

In one embodiment of the present disclosure, a wired power transmission system for a smart glass includes a connector module connected to a holder bracket for fixing the smart glass through a power connector and transmitting power to the smart glass, an inverter varying an applied voltage of the power so as to change the power or the voltage of the smart glass, and a cable module electrically connecting the power connector and the inverter through a power cable and maintaining an electrical connection state by forming a tension of the power cable through an interval change between the connector module and the inverter by means of a movement distance for the connector module to change an interval formed with the inverter.

As a preferred embodiment, the change of the power or the voltage causes a change of light transmittance of the smart glass.

As a preferred embodiment, the connector module includes a power transmission unit provided on the smart glass, and an electric wire electrically connecting the power connector and the power transmission unit so as to transmit the power.

As a preferred embodiment, the connection of the power connector and the holder bracket is performed by a release lever of the power connector and a hook of the holder bracket, and the release lever and the hook form a detachable connection by an elastic leg.

As a preferred embodiment, the cable module includes a holder mounting bracket electrically connecting the power connector and a left cable end of the power cable, and a tensioner wound with the power cable and winding or unwinding the power cable so as to change a length of a flexible wire of the power cable in accordance with the movement distance.

As a preferred embodiment, the holder mounting bracket includes a cursor inserting the power connector into a connector groove formed on a plate body, and a lead frame forming a frame body connected to a frame channel formed on the plate body and connecting the power connector and the left cable end through a terminal provided on the frame body.

As a preferred embodiment, the cursor forms a holder grip on the plate body, and the holder grip is connected to the holder bracket.

As a preferred embodiment, the lead frame forms a first terminal connector and a second terminal connector at both end portions of the frame body, wherein the first terminal connector is connected to the power connector, and the second terminal connector is connected to the left cable end.

As a preferred embodiment, the connection between the first terminal connector and the power connector and the connection between the second terminal connector and the left cable end form electrical connections with the terminal, and electrical connection directions of the terminal are opposite to each other at the first terminal connector and the second terminal connector.

As a preferred embodiment, the second terminal connector is hidden by a protection cap.

As a preferred embodiment, the cursor and the lead frame are fixed by screws.

As a preferred embodiment, the tensioner includes a rotary body wound with the power cable and being rotated to wind or unwind the power cable, a fixed body provided with a center shaft onto which the rotary body is fitted and rotated and forming a spring space by a spring housing forming a concentric circle with the center shaft, a cover fixed to the center shaft and blocking a secession of the rotary body, and a return spring built in the spring space and restoring the rotary body with an elastic force by rotation of the rotary body.

As a preferred embodiment, each of the rotary body and the cover forms a cable slit, and the power cable gets out of the tensioner through the cable slit.

As a preferred embodiment, the return spring is composed of a coil spring.

In another embodiment of the present disclosure, a vehicle includes a door having an inner space in which a door carrier panel connected to a holder bracket for fixing a smart glass, of which a power or a voltage is changed through an applied voltage, is provided. The vehicle further includes a wired power transmission system configured to supply the power to a power transmission unit provided on the smart glass through a power connector connected to the holder bracket, be electrically connected to the power connector through a terminal of a holder mounting bracket mounted on the door carrier panel, connect the power of an inverter mounted on the door carrier panel to the terminal through a power cable, and maintain a cable tension through a length change of a flexible wire of the power cable in an ascending/descending movement process of the smart glass by winding or unwinding the power cable through a tensioner.

As a preferred embodiment, the power or the voltage changed through the applied voltage changes light transmittance of the smart glass.

As a preferred embodiment, the power connector, the holder mounting bracket, and the tensioner are mounted on a wet side on which the door carrier panel is directed outdoors, the inverter is mounted on a dry side on which the door carrier panel is directed indoors, and the power cable is drawn from the dry side to the wet side through a cable hole of the door carrier panel, wherein the cable hole is sealed by a grommet being penetrated by the power cable.

As a preferred embodiment, the inverter is connected to an inverter controller, and the inverter controller varies the applied voltage through power control of the inverter.

The wired power transmission system for the smart glass applied to the door of the vehicle according to embodiments of the present disclosure implements the following working effects.

First, it is possible to supply the power to the smart glass using a cable on the existing vehicle door. Second, it is possible to perform power transmission/reception even during the ascending/descending operation of the smart glass that is the basic function of the door. Third, since the component parts of the existing vehicle door are used, it is possible to secure the watertight performance for the wet zone on the wet side against the dry side of the door even under the power transmission/reception of the smart glass. Fourth, the inline assembly can be performed in the vehicle assembly line for assembling the existing vehicle door. Fifth, since the power transmission system for the smart glass is the wired power transmission/reception system, the manufacturing cost can be minimized in comparison with the wireless system. Sixth, since the stable power is supplied to the smart glass applied to the vehicle door, the system can go beyond the simple door window function, and can be grafted into the audio/video/navigation/telematics (AVNT) system technology of the vehicle fused with the IT technology. Accordingly, various services and convenience functions for passengers can be provided in the vehicle, and such functions facilitate concept implementation of autonomous vehicles or future cars.

It is to be understood that both the foregoing general description and the following detailed description of embodiments of the present disclosure are exemplary and are intended to provide further explanation of the disclosure as claimed.

BRIEF DESCRIPTION OF THE DRAWINGS

The above and other objects, features and other advantages of embodiments of the present disclosure will be more clearly understood from the following detailed description taken in conjunction with the accompanying drawings, in which.

DETAILED DESCRIPTION OF ILLUSTRATIVE EMBODIMENTS

Hereinafter, preferred embodiments of the present disclosure will be described in detail with reference to the accompanying exemplary drawings. However, since such embodiments are exemplary and can be implemented in various different types by those of ordinary skill in the art to which the present disclosure pertains, the present disclosure is not limited to the embodiments described hereinafter.

Figure 1:
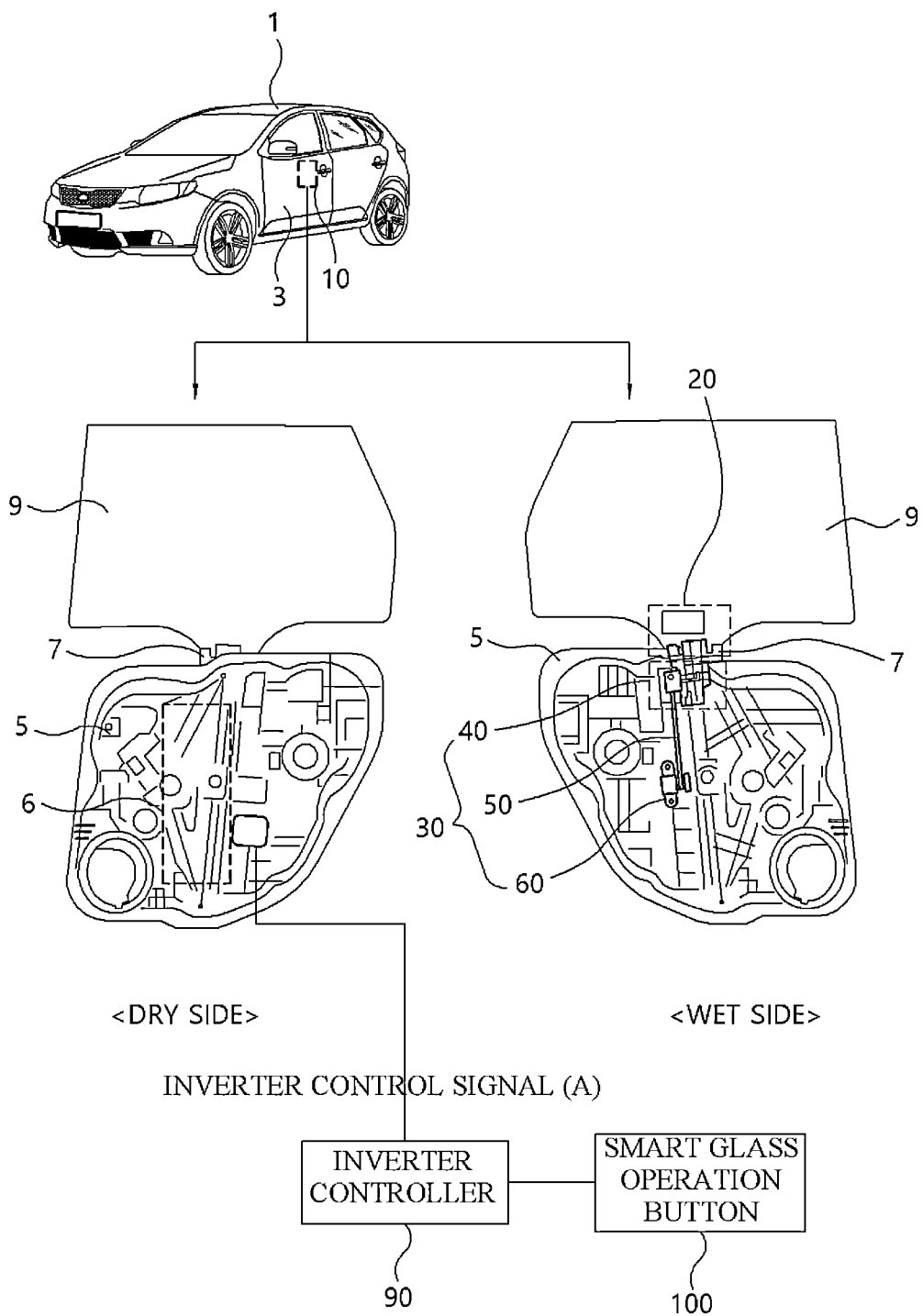
FIG. 1 shows an example of a vehicle to which a wired power transmission system for a smart glass, being connected to the smart glass of a door, is applied according to embodiments of the present disclosure.

Referring to FIG. 1, a vehicle 1 is provided with a wired power transmission system 10 for a smart glass 9 on a door 3.

Specifically, the door 3 includes a door carrier panel 5, a holder bracket 7, and the smart glass 9.

As an example, the door carrier panel 5 is located within a mutual space formed by a door inner panel (not illustrated) fused with a door outer panel, and is provided as a place in which a door regulator member 6 for ascending/descending of the smart glass 9 is mounted. Since the door regulator member 6 is a common configuration of the door, the explanation thereof will be omitted.

As an example, the holder bracket 7 functions as a component part which connects the door carrier panel 5 and the smart glass 9 and to which a power connector 21 of a connector module 20 constituting the smart glass wired power transmission system 10 is connected.

As an example, the smart glass 9 functions as a window of the door 3, and ascends/descends through driving of the door regulator member 6. A power or a voltage of the smart glass 9 is changed through a power transmission unit 25 (refer to FIG. 2) which is attached onto a smart film and adjusts an applied voltage.

Through this, since the light transmittance of the smart glass 9 is changed through the change of the power or the voltage thereof, the smart glass 9 displays various smart images while adjusting the sunlight and the light of a vehicle headlight.

For this, the smart glass 9 is provided with a single layer film composed of any one of a suspended particle device (SPD) film, a polyvinyl butyral (PVB) film, and an ethylene vinyl acetate (EVA) film, or a multi-layer film obtained by overlapping the single layer films, which is located between the glasses.

Accordingly, the smart glass 9 may be any one of an electrochromic glass of which the light transmittance is changed according to electricity, a thermochromic glass of which the light transmittance of the visible light area or the infrared area is changed according to the temperature or heat, and a thermotropic glass of which the light transmittance of the visible light area or the infrared area is changed according to the temperature.

Figure 8:
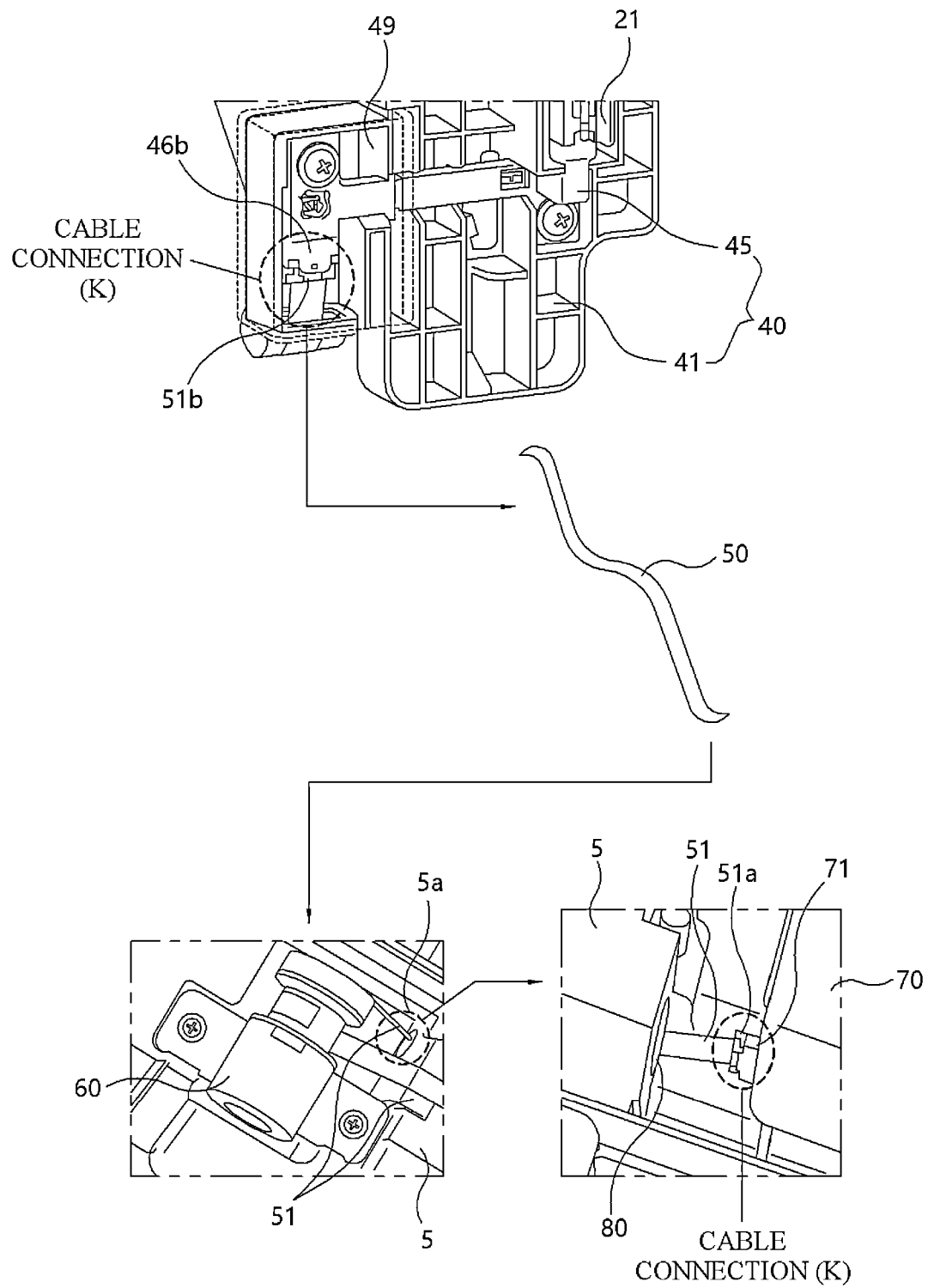
FIG. 8 is a view illustrating an assembled state in which a power cable is connected to a lead frame and an inverter according to embodiments of the present disclosure.

Specifically, the wired power transmission system 10 for the smart glass is composed of a connector module 20, a cable module 30, an inverter 70, and a grommet 80 (refer to FIG. 8).

As an example, the connector module 20 supplies a power to the smart glass 9, and the cable module 30 connects the connector module 20 and the inverter 70 and is mounted on a wet side surface of the door carrier panel 5. In this case, the wet side is an outdoor side, and is defined as a direction toward the outside of the vehicle in a state where the door 3 is mounted on the vehicle 1.

In particular, the cable module 30 maintains an electrical connection state between the connector module 20 and the inverter 70 during the ascending/descending movement of the smart glass 9 according to the driving of the door regulator member 6.

As an example, the inverter 70 provides the power, is mounted on a dry side surface, and is connected to a vehicle power supply or a battery to supply the power. In this case, the dry side is an indoor side, and is defined as a direction toward the indoor side of the vehicle in a state where the door 3 is mounted on the vehicle 1.

In particular, the inverter 70 varies the applied voltage, and is electrically connected to the connector module 20 via the cable module 30 to vary the power being applied to the power transmission unit 25 (refer to FIG. 2) of the connector module 20.

As an example, the grommet 80 (refer to FIG. 8) is fitted into a cable hole 5a formed on the door carrier panel 5 in a state where it surrounds a power cable 50 (refer to FIG. 8) of the cable module 30 that goes from the dry side to the wet side of the door carrier panel 5 so as to be connected from the connector module 20 to the inverter 70. In this case, the grommet 80 is made of rubber.

Further, the smart glass wired power transmission system 10 may include an inverter controller 90 and an operation button 100.

As an example, the inverter controller 90 recognizes an operation of the operation button 100, and controls the power of the inverter 70 by outputting an inverter control signal A so as to control the variable degree of the power being applied to the power transmission unit 25 (refer to FIG. 2) of the connector module 20. In this case, the inverter controller 90 may be integrated with the inverter 70.

As an example, the operation button 100 may be provided on a cluster of the driver's seat in the interior of the vehicle 1, and is electrically connected to the inverter controller 90. A press type button or a rotary type dial may be applied as the operation button 100.

Figure 2:
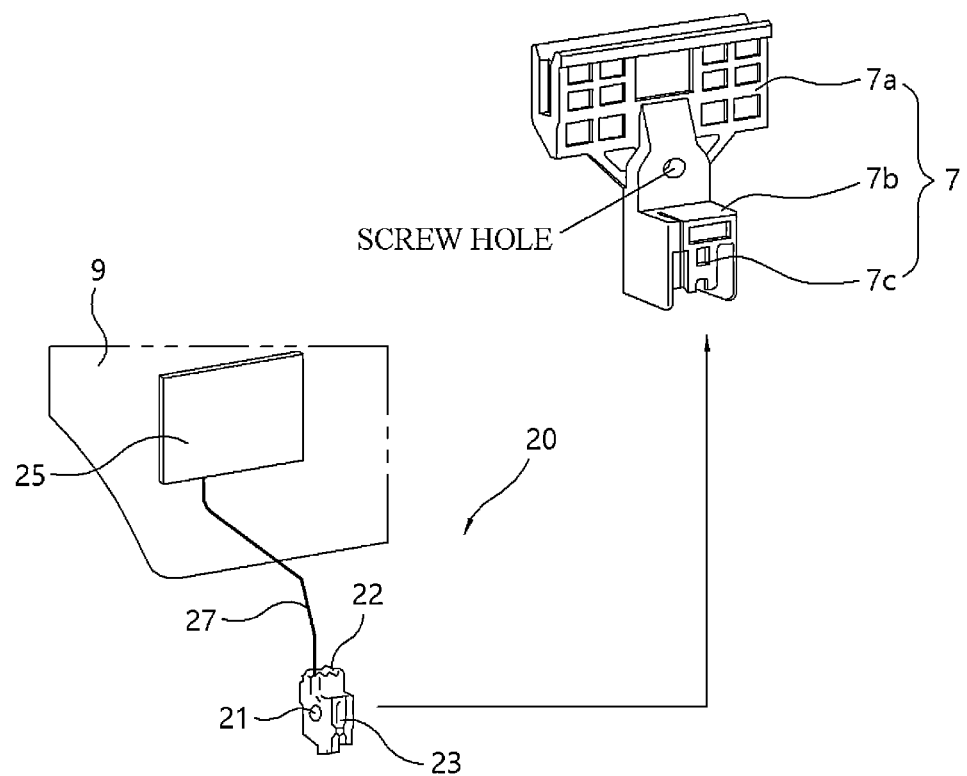
FIG. 2 is a view illustrating the configuration of a glass holder, a power transmission unit, and an electric wire constituting a power supply module of a wired power transmission system for a smart glass according to embodiments of the present disclosure.
Figure 3:
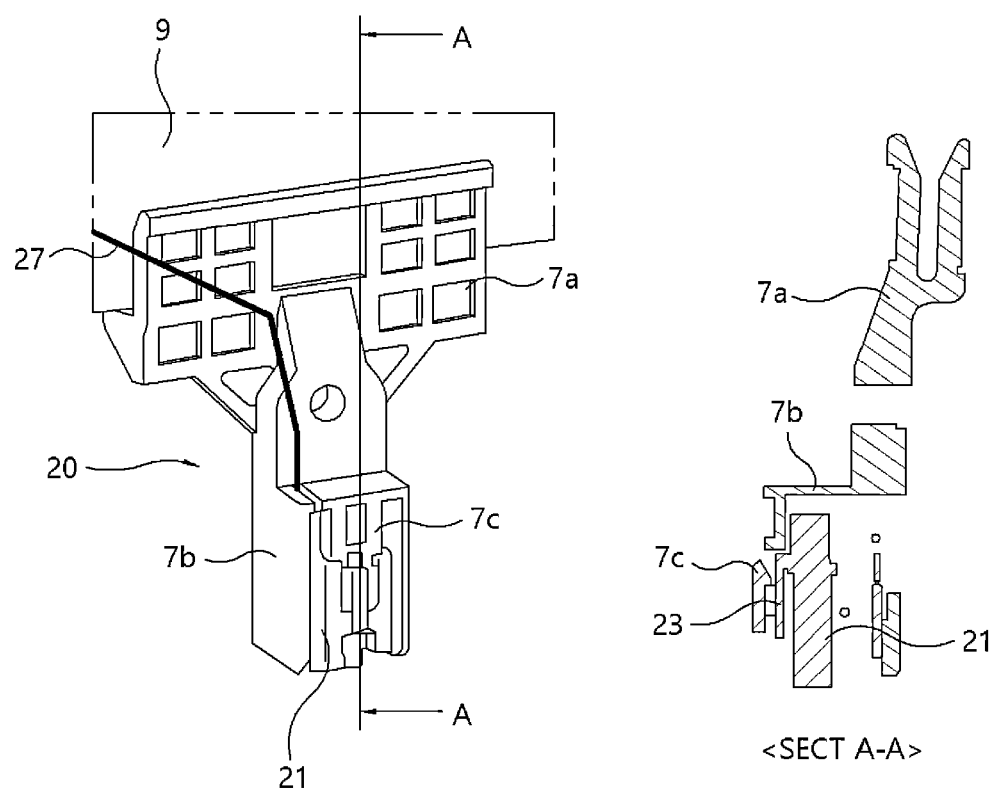
FIG. 3 is a view illustrating an assembled state of a power connector connected to a holder bracket of a door with the power connector connected to a conductive film through an electric wire according to embodiments of the present disclosure.

Meanwhile, FIGS. 2 and 3 exemplarily illustrate the detailed configuration of the connector module 20.

Referring to FIG. 2, the connector module 20 is composed of a power connector 21, a power transmission unit 25, and an electric wire 27.

As an example, the power connector 21 includes a rectangular connector body fitted into a connector holder 7b of the holder bracket 7, a wire terminal 22 communicating with an inner space is formed at one end portion of the rectangular connector body, and a release lever 23 having elasticity is provided on one side of the connector body.

Further, the release lever 23 is assembled with the power connector 21 of the connector module 20 connected to a cursor 41 of a holder mounting bracket 40.

For this, the holder bracket 7 is separated into a glass holder 7a, a connector holder 7b, and a hook 7c. In this case, the glass holder 7a is fixed to a lower part of the smart glass 9 inserted in a "⌴" cross-sectional shape through a screw, and the connector holder 7b forms an integrated structure with the glass holder 7a at a lower part of the glass holder 7a, and forms a rectangular body having an inner space so that the power connector 21 is fitted into the connector holder 7b. The hook 7c forms an integrated structure with the connector holder 7b on one side of the rectangular body, and is combined with the release lever 23.

Accordingly, the power connector 21 and the holder bracket 7 are detachably combined with each other in an elastic leg locking structure (refer to cross section A-A).

As an example, the elastic leg locking structure is in an incised leg shape so that the release lever 23 and the hook 7c have elasticity. Through this, the leg elasticity of the hook 7c forms a fixing force so that the hook 7c is open while the power connector 21 is fitted into the connector holder 7b, and then is restored in the fitted state of the power connector 21 and the connector holder 7b. The leg elasticity of the release lever 23 makes the release lever 23 elastically deformed to release the fixing force by pressing the release lever 23 (or the hook 7c) with a specific force through a tool 200 (refer to FIG. 6), and then the release lever 23 is restored in the non-combined state. Of course, the inter-leg locking structure having the elasticity is a common structure.

As an example, the power transmission unit 25 is connected to the electric wire 27, and is attached onto the surface of the smart glass 9. The power transmission unit 25 operates to change light transmittance of the smart glass 9 through the power being supplied through the electric wire 27. In this case, the power transmission unit 25 is provided on a part of a smart film so as to be electrically connected to the smart film built in the smart glass 9.

As an example, the electric wire 27 is a power line made of copper or an equivalent material, and is connected to the power transmission unit 25 in a state of being fitted into a wire terminal 22 of the power connector 21 to transfer the power of the inverter 70 to the power transmission unit 25.

Referring to FIG. 3, the connector module 20 is detachably combined with the holder bracket 7 by applying a connector assembly structure using the release lever 23 of the power connector 21 and the hook 7c of the holder bracket 7.

As an example, the release lever 23 of the power connector 21 is combined with the hook 7c of the holder bracket 7 through a locking structure (refer to cross section A-A) between the leg of the hook 7c and the leg of the release lever 23, and the leg has elasticity and can be elastically deformed by an external force.

Further, the wire terminal 22 has a structure that bites and fixes strands of the electric wire 27 fitted into the wire terminal 22, and electrically connects a terminal 47 (refer to FIG. 5) of the holder mounting bracket 40 constituting the cable module 30 inserted into the inner space of the rectangular connector body to the electric wire 27.

Figure 4:
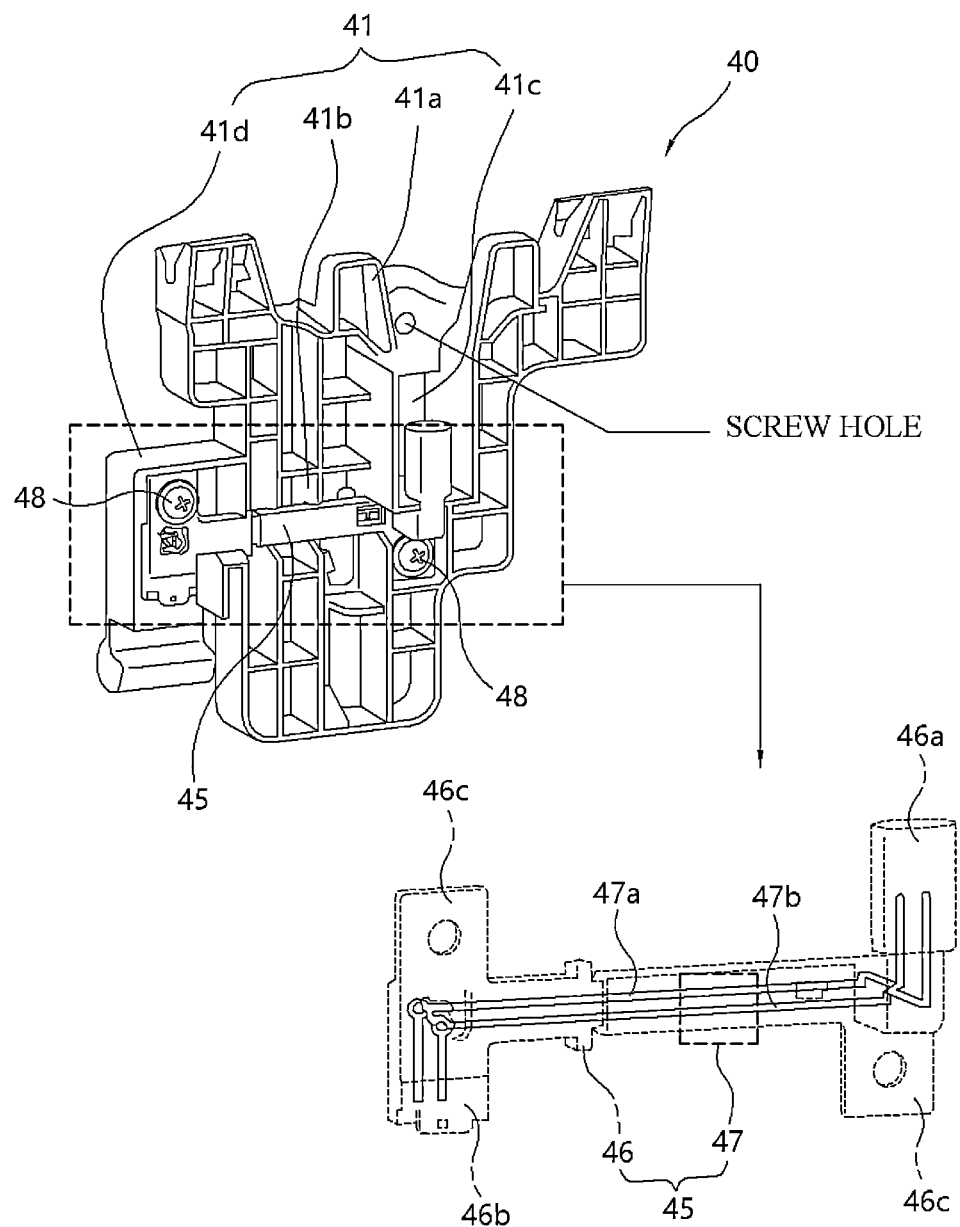
FIG. 4 is a view illustrating the configuration of a holder mounting bracket constituting a wired power module of a wired power transmission system for a smart glass according to embodiments of the present disclosure.
Figure 5:
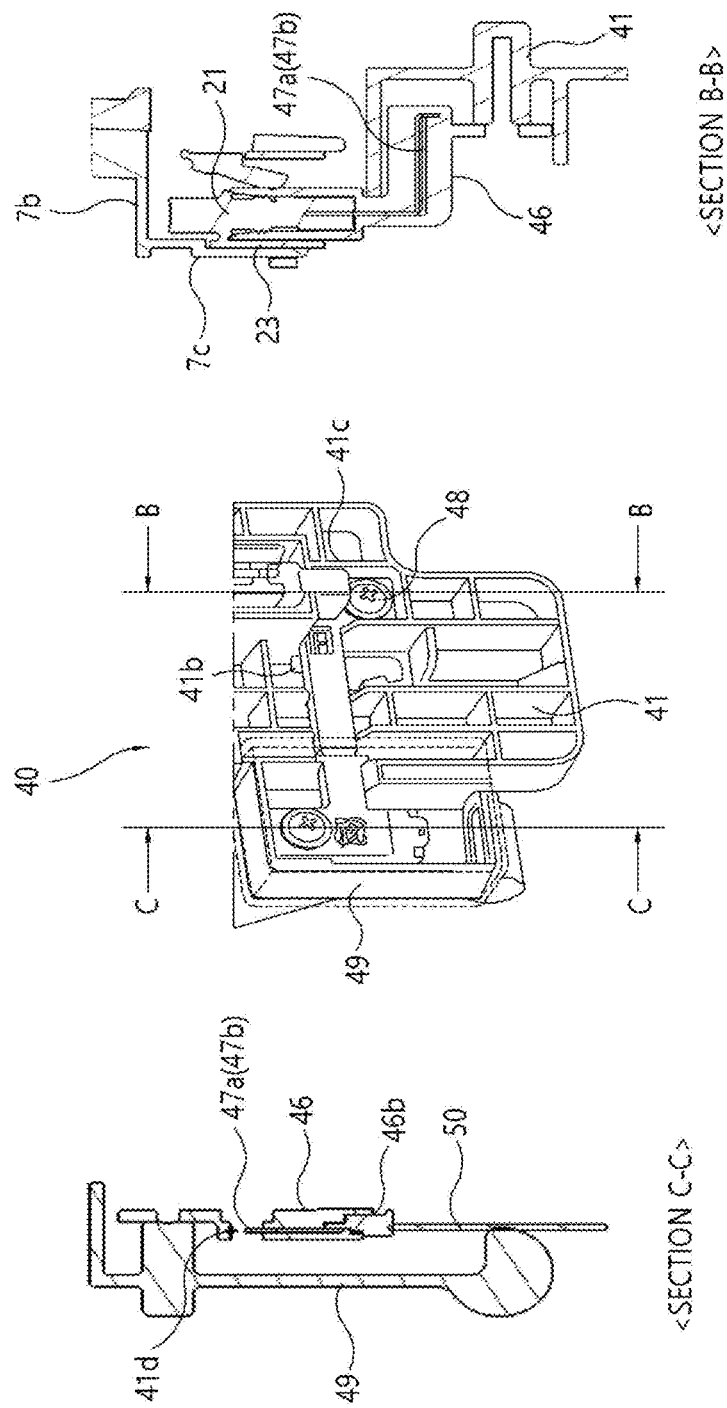
FIG. 5 is a cross-sectional view of an assembly of a cursor and a lead frame of a holder mounting bracket according to embodiments of the present disclosure.
Figure 6:
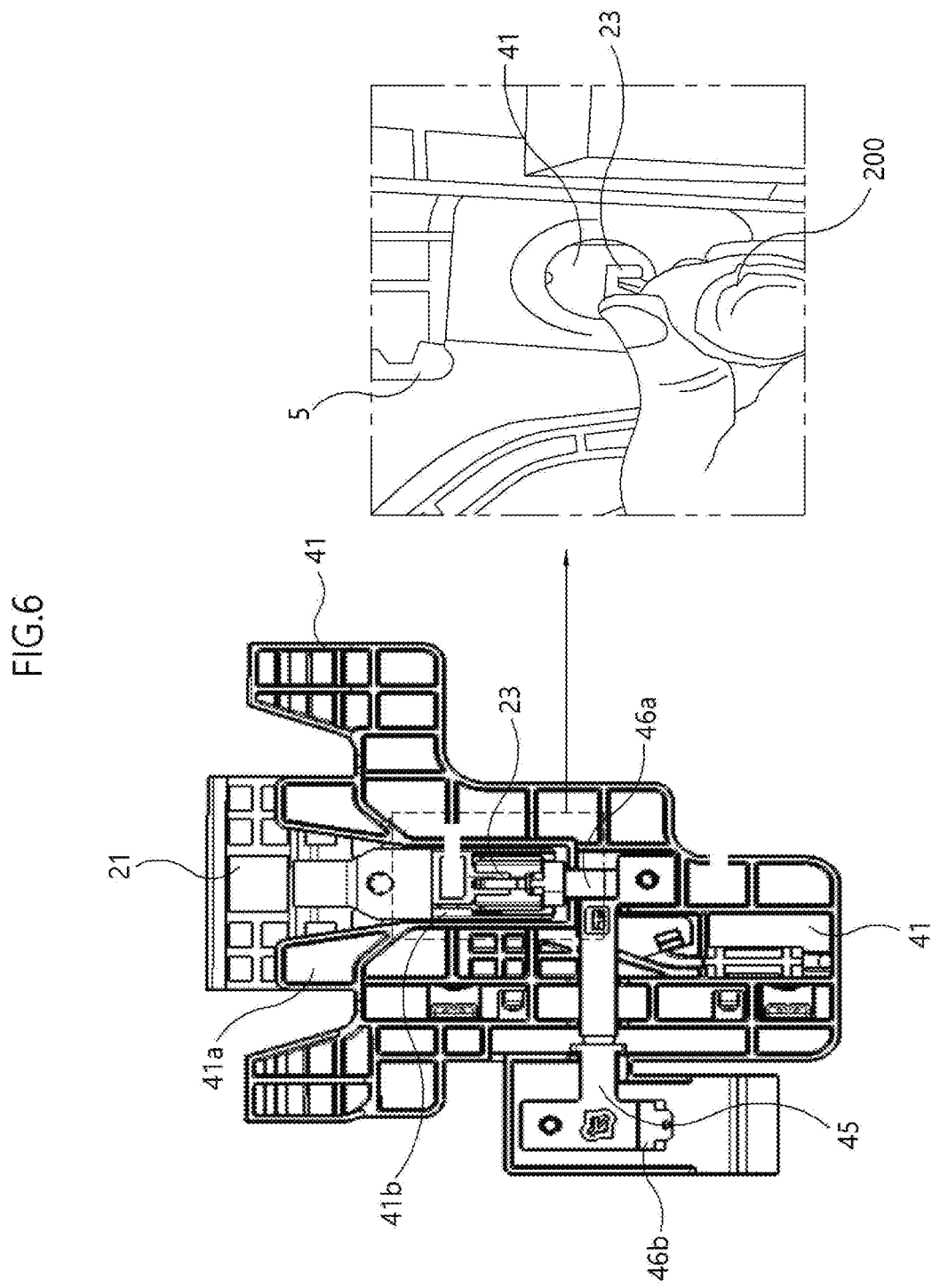
FIG. 6 is a view illustrating a separation work of a cursor and a power connector according to embodiments of the present disclosure.

Further, FIGS. 4 to 6 exemplify that the holder mounting bracket 40 is composed of a cursor 41, a lead frame 45, a screw 48, and a protection cap 49.

Referring to FIG. 4, the cursor 41 is composed of a plate body on which is formed a plurality of ribs having stiffness, and the lead frame 45 is in an "H" shape and is fixed to the plate body of the cursor 41 via the screw 48.

As an example, the cursor 41 forms a holder grip 41aa frame channel 41ba connector groove 41c and a cable connector 41d on the plate body. In this case, the holder grip 41a forms an upper part of the plate body and is padded on the connector holder 7b of the holder bracket 7. The frame channel 41b is formed as an "H"-shaped groove on one surface of the plate body so that the lead frame 45 is seated thereon. The connector groove 41c is formed on one side of the plate body so that the power connector 21 of the connector module 20 of the frame channel 41b is inserted into the connector groove 41c. The cable connector 41d is extended on an opposite side of the plate body so that one part of the power cable 50 is located therein.

In particular, the holder grip 41a has a screw hole formed thereon to be penetrated by a screw (not illustrated), and combines the cursor 41 with the holder bracket 7 as the screw is fastened to the screw hole formed on the connector holder 7b. Further, in the same manner as the lead frame 45, the frame channel 41b is formed as an "H"-shaped groove.

As an example, the lead frame 45 is composed of a frame body 46 and a terminal 47. In this case, the frame body 46 is in an "H" shape, and forms a vertical first terminal connector 46a (e.g., left part) and a second terminal connector 46b (e.g., right part) on both left/right sides of a horizontal connection section thereof. The terminal 47 is arranged along the first terminal connector 46a, the frame body 46, and the second terminal connector 46b, and is composed of first and second terminals 47a and 47b having two conductive strands.

In particular, screw holders 46c are formed on the first and second terminal connectors 46a and 46b, respectively, in a manner that one screw holder 46c is formed at the bottom of the first terminal connector 46a and the other screw holder 46c is formed at the top of the second terminal connector 46b.

As an example, the screw 48 fixes the lead frame 45 to the cursor 41. For this, two screws 48 are provided, so that one of the screws 48 is fastened to the cursor 41 through the screw hole formed on the first terminal connector 46a and the other is fastened to the cursor 41 through the screw hole formed on the second terminal connector 46b. Accordingly, one of the screws 48 is located at the bottom of the lead frame 45 on the side of the first terminal connector 46a, whereas the other is located at the top of the lead frame 45 on the side of the second terminal connector 46b.

Referring to FIG. 5, the protection cap 49 is combined with the cable connector 41d of the cursor 41 to surround the second terminal connector 46b of the lead frame 45, and thus blocks the penetration of foreign substances against the connection part between the second terminal connector 46b and the power cable 50.

In particular, with reference to cross section B-B of FIG. 5, one side of the first and second terminals 47a and 47b is connected to the power connector 21 of the connector module 20 on the side of the first terminal connector 46a. In contrast, with reference to cross section C-C of FIG. 5, the opposite side of the first and second terminals 47a and 47b is connected to the power cable 50 on the side of the second terminal connector 46b.

Through this, the first and second terminals 47a and 47b connect the power of the power cable 50 to the power connector 21, and thus the power of the inverter 70 being supplied to the power transmission unit 25 connected to the power connector 21 can be continuously supplied without being cut off.

Accordingly, since the holder mounting bracket 40 is assembled with the holder bracket 7 using the cursor 41, the holder mounting bracket 40 ascends/descends together with the holder bracket 7 when being moved by the door regulator member 6 while supporting the smart glass 9, and connects the power cable 50 and the power connector 21 using the lead frame 45 so as to form a power supply path connected between the inverter 70 and a conductive film 26.

Referring to FIG. 6, an example of separation work is illustrated, in which the assembled holder mounting bracket 40 and the connector module 20 are separated from each other by the release lever 23 of the power connector 21.

As illustrated, by inserting the tool 200 into a tool hole formed on the plate body of the cursor 41 toward the connector groove 41c and pressing the release lever 23 through pressing of the tool 200 with a specific force, the holder mounting bracket 40 and the connector module 20 can be simply separated from each other through pressing down of the cursor 41 in a state where the release lever 23 is elastically deformed.

Figure 7:
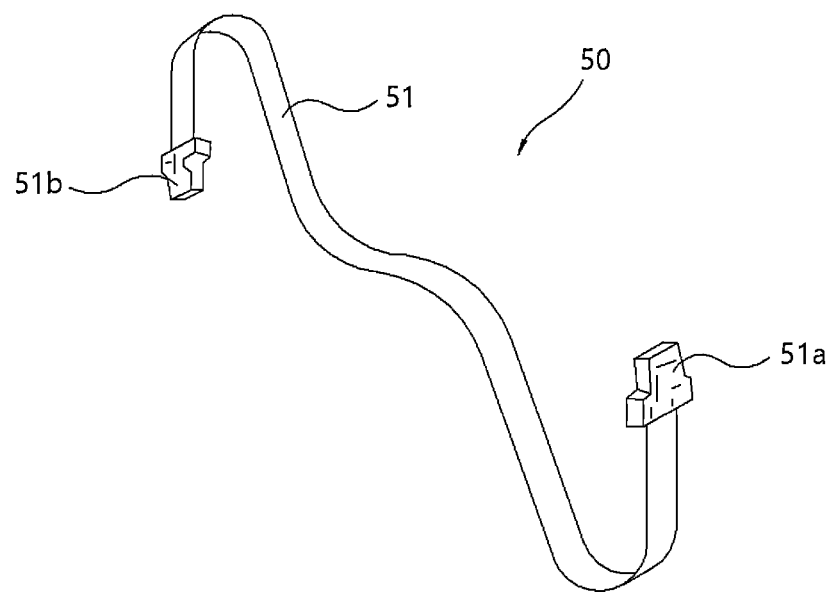
FIG. 7 is a view illustrating the configuration of a power cable constituting a wired power module according to embodiments of the present disclosure.

Further, FIGS. 7 and 8 illustrate the power cable 50 and a connected state of the lead frame 45, a tensioner 60, and the inverter 70 using the power cable 50.

Referring to FIG. 7, the power cable 50 connects a separation distance formed between the connector module 20 and the inverter 70 through the length of a flexible wire, and absorbs the separation distance that is changed by the ascending/descending movement of the connector module 20 against the fixed inverter 70 through the change of the length of the flexible wire.

For this, the power cable 50 is composed of a flexible wire having a specific length, and is provided with a first cable connector 51a at the right cable end and a second cable connector 51b at the left cable end. In this case, the specific length is a distance formed between the inverter 70 and the maximum ascending position of the smart glass 9 in a state where a partial wire length is wound on the tensioner 60. Accordingly, the specific length is the flexible wire length, and is equal to the separation distance formed by the connector module 20 and the inverter 70.

As an example, the flexible wire 51 includes a +/− wire and a GND wire. Of the first and second cable connectors 51a and 51b, the first cable connector 51a is provided on one side of the flexible wire 51, and the second cable connector 51b is provided on the other side of the flexible wire 51.

Referring to FIG. 8, the power cable 50 is put into an inverter terminal 71 of the inverter 70 through the first cable connector 51a to form the cable connection K, and is put into the second terminal connector 46b of the lead frame 45 through the second cable connector 51b to form the cable connection K.

In particular, the power cable 50 gets out of the cable hole 5a in a state where the first cable connector 51a is surrounded by the grommet 80 fitted into the cable hole 5a of the door carrier panel 5 in a state where the partial length of the flexible wire 51 is wound on the tensioner 60, and thus the locations on the wet side and the dry side (refer to FIG. 1) are reversed.

Accordingly, the inverter 70 is located on the dry side of the door carrier panel 5, and an inverter electric circuit can be protected from shorts due to water leakage through a waterproof function on the wet side being formed by the grommet 80.

Figure 9:
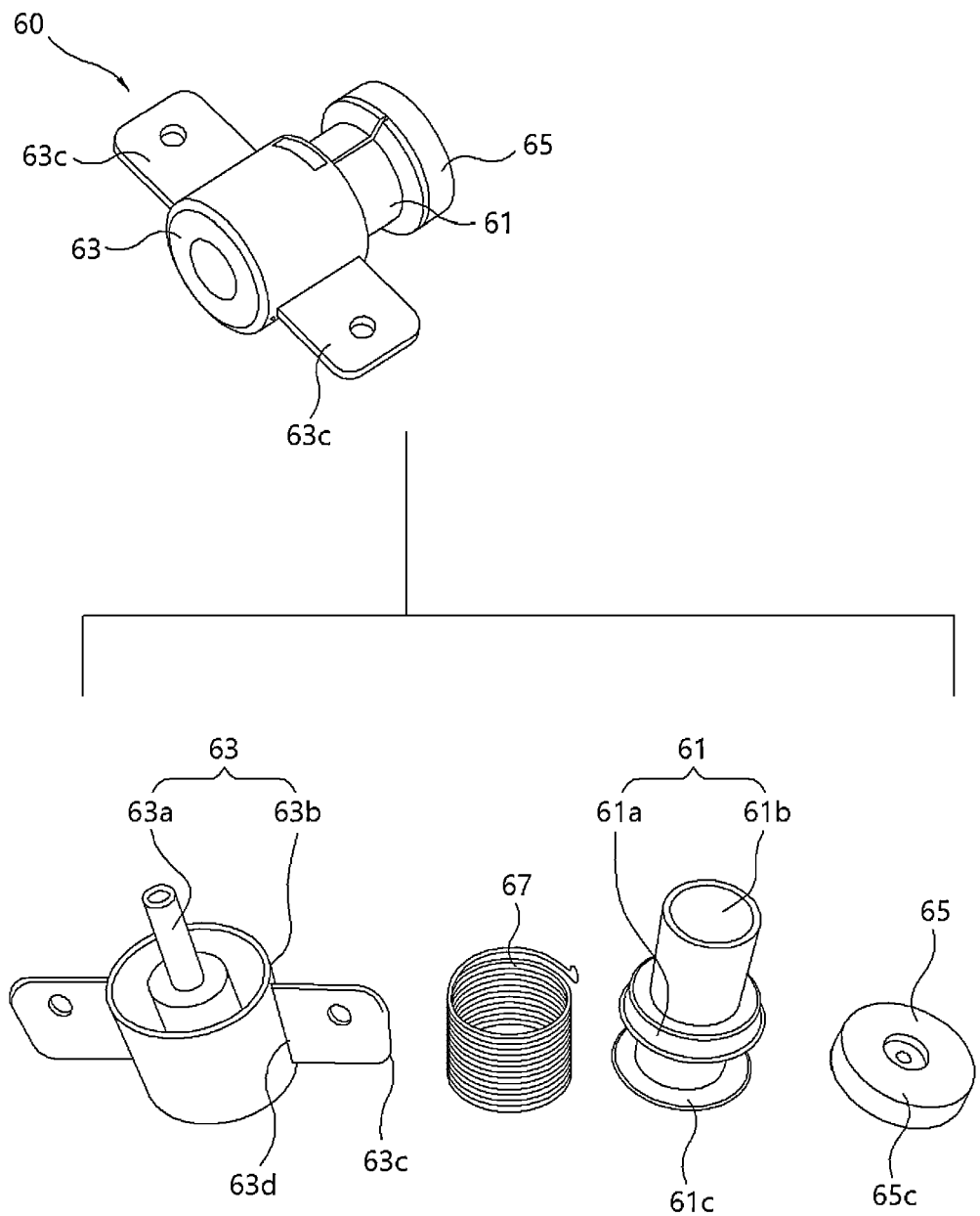
FIG. 9 is a view illustrating the configuration of a tensioner constituting a wired power module according to embodiments of the present disclosure.
Figure 10:
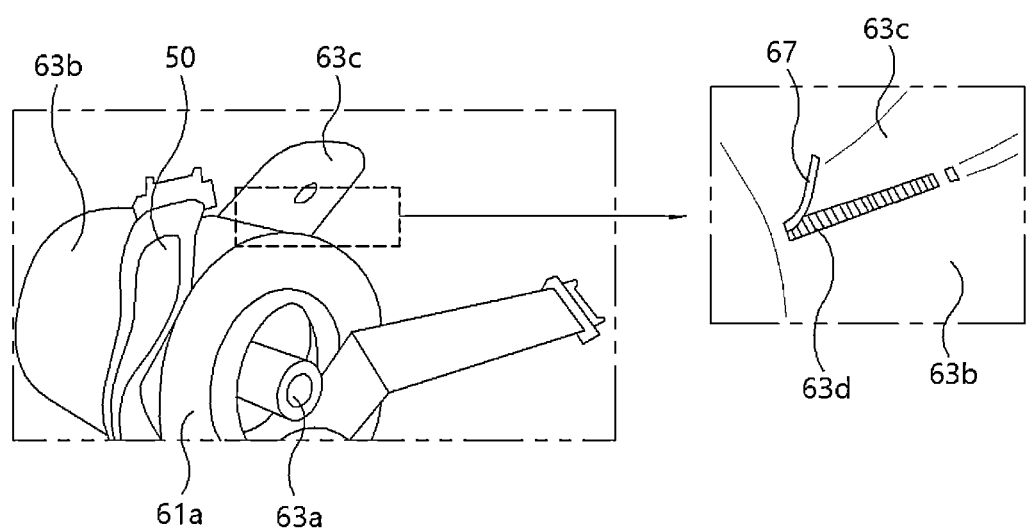
FIG. 10 is a view illustrating an assembled state of a tensioner and a power cable according to embodiments of the present disclosure.
Figure 11:
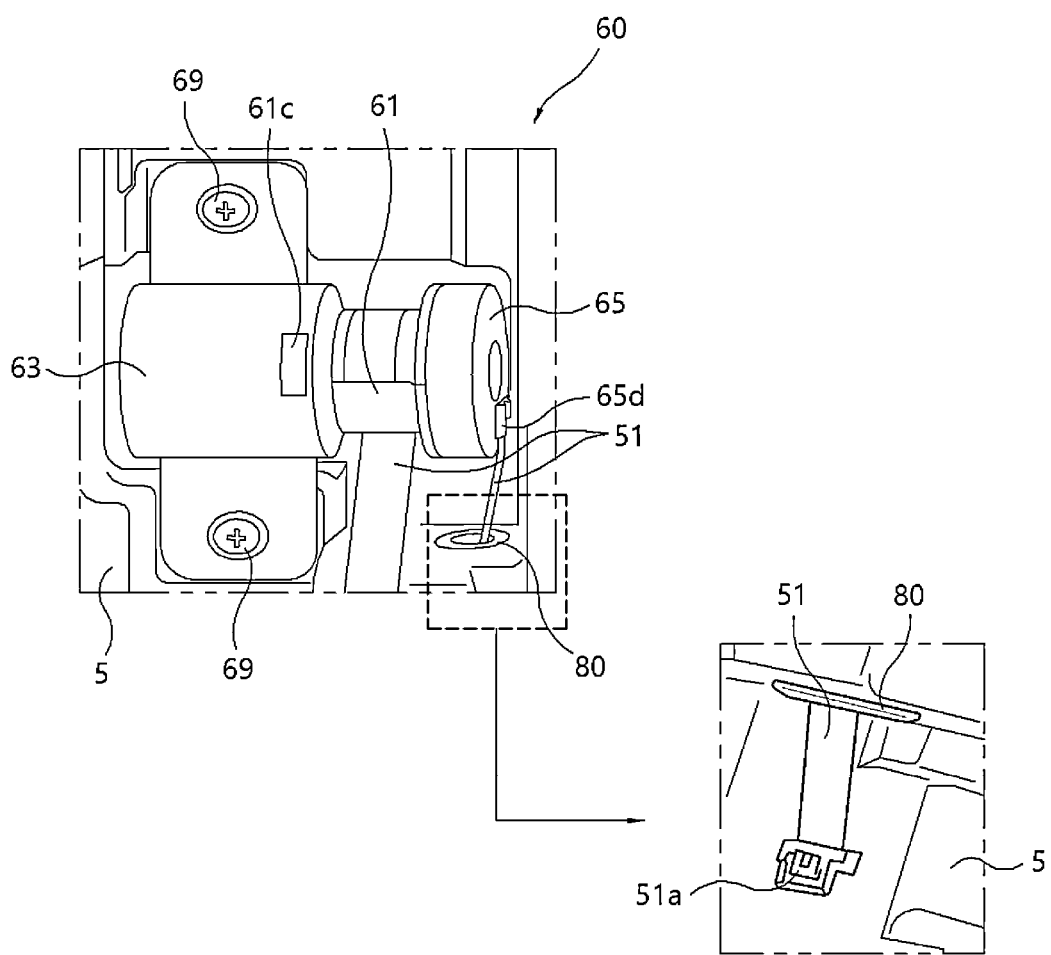
FIG. 11 is a view illustrating a state that a region in which a power cable assembled with a tensioner goes toward a dry side is sealed by a grommet according to embodiments of the present disclosure.

Further, FIGS. 9 to 11 illustrate detailed constituent elements of the tensioner 60.

Referring to FIG. 9, the tensioner 60 is composed of a rotary body 61, a fixed body 63, a cover 65, a return spring 67, and a screw 69.

As an example, the rotary body 61 is composed of a winding shaft 61a on which the flexible wire 51 of the power cable 50 is wound, a connection shaft 61b extending from the winding shaft 61a so as to be loosely fitted into a center shaft 63a of the fixed body 63, and a cable slit 61c of a gap structure separated in a length direction of the winding shaft 61a so that the flexible wire 51 gets out in a state where the part of the first cable connector 51a of the flexible wire 51 wound on the winding shaft 61a is supported. In this case, the connection shaft 61b has a diameter that is smaller than that of the winding shaft 61a, and forms a concentric circle with the winding shaft 61a.

As an example, the fixed body 63 is composed of a center shaft 63a combined with the rotary body 61 and the cover 65, a spring housing 63b forming a concentric circle with a connection shaft section of the center shaft 63a so as to accommodate the return spring 67, and a fixed flange 63c having a screw hole formed thereon and projecting from both left/right sides of the spring housing 63b. In this case, on the center shaft 63a, the connection shaft section combined with the connection shaft 61b of the rotary body 61 and a cover shaft section fitted and combined with the cover 65 form concentric circles with the diameter difference, and the spring housing 63b forms a concentric circle with the diameter difference so as to form a spring space with the center shaft 63a.

As an example, the cover 65 is fixed to the center shaft 63a of the fixed body 63, and blocks the secession of the rotary body 61. For this, the cover 65 has a "⌐" cross-sectional shape structure having a shaft hole formed in the center and fitted into the center shaft 63a of the fixed body 63, and a cable slit 65c having a gap structure diagonally separated against the center shaft hole is formed, so that the flexible wire 51 gets out in a state where the portion of the first cable connector 51a of the flexible wire 51 wound on the winding shaft 61a is supported.

As an example, the return spring 67 is composed of a coil spring having both bent spring ends, and is built in the spring space formed by the center shaft 63a and the spring housing 63b of the fixed body 63 in a state of surrounding the connection shaft 61b of the rotary body 61.

Referring to FIG. 10, the rotary body 61 is assembled with the fixed body 63 in a state where a part of the flexible wire 51 of the power cable 50 is wound thereon. Accordingly, by winding the flexible wire 51 of the power cable 50 on the winding shaft 61a, the rotary body 61 is rotated by winding or unwinding the power cable 50 through ascending/descending movement of the smart glass 9 during the driving of the door regulator member 6.

Further, the return spring 67 is accommodated in the spring housing 63b of the fixed body 63 in a state where the return spring 67 is fitted into the connection shaft 61b of the rotary body 61, and both end parts of the return spring 67 get out through the spring slit 63d having the gap structure incised with a width size of the fixed flange 63c in the spring housing 63b having both left/right sides on which the fixed flange 63c is formed, so that the spring slit 63d gets caught on the fixed flange 63c.

Accordingly, the return spring 67 is compressed by the rotation of the rotary body 61 through the unwinding or winding movement of the power cable 50, and then restores the rotary body 61 that is a tensioner rotary part through its restoring force.

Referring to FIG. 11, the cover 65 of the tensioner 60 forms the projection cable guide 65d projecting from the left/right sides of the cable slit 65c, and thus can hold the position so as to prevent the secession of the part of the first cable connector 51a of the flexible wire 51 having gotten out of the cable slit 65c.

Further, the screw 69 is fastened to the door carrier panel 5 through the screw hole formed on the fixed flange 63c of the fixed body 63, and thus the tensioner 60 is fixed to the door carrier panel 5.

As described above, as the rotating force of the rotary body 61 winds or unwinds the flexible wire 51 of the power cable 50, the tensioner 60 adjusts the wire length of the flexible wire 51 to match the ascending/descending movement of the smart glass 9. The elastic restoring force of the return spring 67 having one end fixed to the rotary body 61 and the other end fixed to the fixed flange 63c restores the rotary body 61 in a state where the ascending/descending movement of the smart glass 9 is stopped.

Meanwhile, FIGS. 12A-12E illustrate examples in which a smart glass 9 is variously used in the vehicle 1 through constant and stable power supply through the smart glass wired power transmission system 10.

Figure 12C:
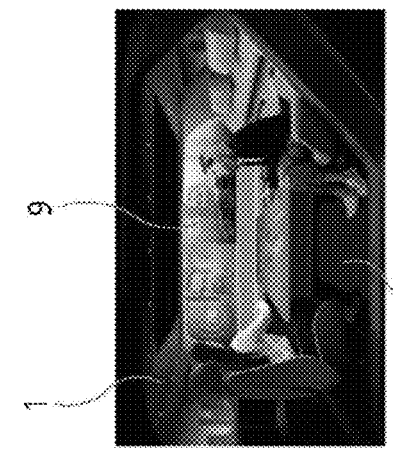
FIGS. 12A-12E illustrate examples of various services and convenience functions implemented by a smart glass to which a wired power transmission system for the smart glass according to embodiments of the present disclosure is applied.
Figure 12B:
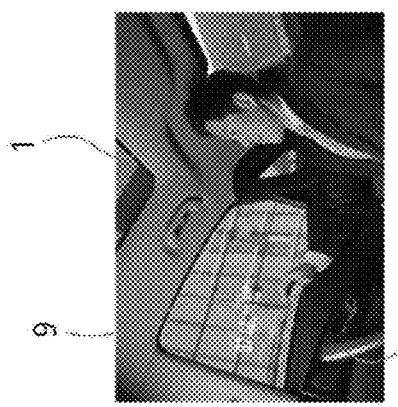
Figure 12A:
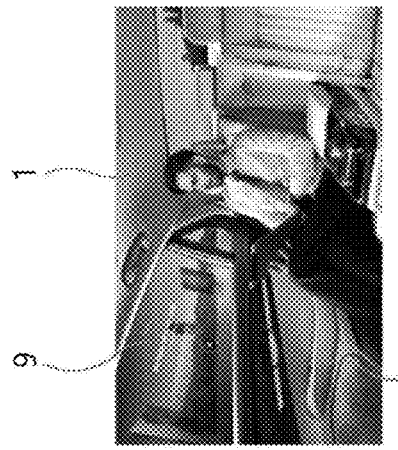
Figure 12E:
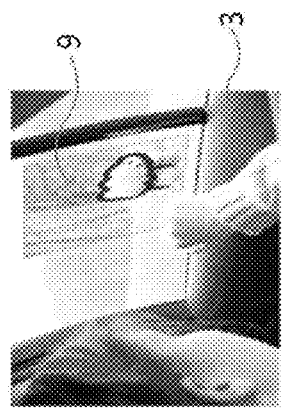
Figure 12D:
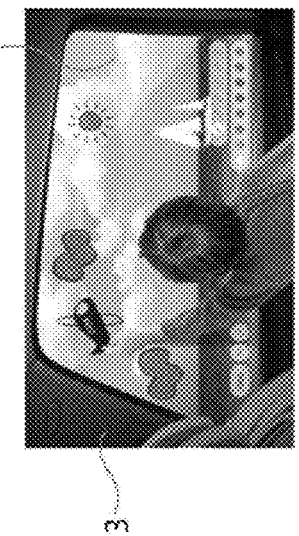

FIGS. 12A, 12B, 12C, and 12D indicate cases in which the smart glass 9 of the door 3 is applied to the vehicle 1 to match the concept of an autonomous vehicle or a future car, and FIG. 12E indicates a case that the smart glass 9 of the door 3 is applied to the current vehicle 1.

Through this, the wired power transmission system 10 for the smart glass applies the smart glass 9 not only to the current vehicle 1 adopting the smart glass 9 but also to match the concept of the autonomous vehicle or the future car, and thus it is exemplified that the application range of the smart glass 9, which provides various services and convenience functions to the passenger through the fusion of the IT technology and AVNT system technology, can be diversely implemented.

As described above, the wired power transmission system 10 for the smart glass 9 applied to the door 3 of the vehicle 1 according to the embodiments is mounted on the door carrier panel 5 provided in the inner space of the door 3, supplies the applied voltage that changes the light transmittance of the smart glass 9 to the power transmission unit 25 through the power connector 21, connects the power of the inverter 70 to the terminal 47 electrically connected to the power connector 21 through the power cable 50, and changes the length of the flexible wire of the power cable 50 by winding or unwinding the power cable 50 through the tensioner 60 during the ascending/descending of the smart glass 9. Accordingly, power transmission/reception is possible in the down state of the smart glass 9, and the inline assembly using the vehicle assembly line is possible while the watertight performance for the wet zone of the inner space of the door is maintained through the application of the grommet 80 for the door carrier panel 5.

While the present disclosure has been described with reference to the exemplified drawings, it will be apparent to those of ordinary skill in the art that the present disclosure is not limited to the described embodiments, and various changes and modifications may be made without departing from the spirit and scope of the present disclosure. Accordingly, such changes and modifications should belong to the claims of the present disclosure, and the right of the present disclosure should be construed based on the appended claims.

What is claimed is:

1. A wired power transmission system for a smart glass, the system comprising:
    a connector module comprising a power connector connected to a holder bracket configured to fix the smart glass, the connector module being configured to transmit power to the smart glass;
    an inverter configured to vary an applied voltage of the power to change the power or the voltage of the smart glass; and
    a cable module electrically connecting the power connector and the inverter through a power cable, the cable module configured to maintain an electrical connection state by forming a tension of the power cable through an interval change between the connector module and the inverter;
    wherein the power connector is connected to the holder bracket by a release lever of the power connector and a hook of the holder bracket;
    wherein the power connection includes a rectangular connector body fitted into a connector holder of the holder bracket, a wire terminal communicating with an inner space is formed at one end portion of the rectangular connector body, and the release lever having elasticity is provided on one side of the connector body,
    wherein the cable module comprises a holder mounting bracket electrically connecting the power connector and a cable end of the power cable;
    wherein the holder mounting bracket comprises a cursor configured to insert the power connector into a connector groove formed on a plate body and a lead frame comprising a frame body connected to a frame channel formed on the plate body and configured to connect the power connector and the cable end through a terminal provided on the frame body;
    wherein the cursor and the lead frame are fixed by screws; and
    wherein one of the screws is located at a bottom portion of the lead frame on the side of a first terminal connector and another one of the screws is located at a top portion of the lead frame on the side of a second terminal connector.

2. The system according to claim 1, wherein the connector module comprises:
    a power transmission unit provided on the smart glass; and
    an electric wire electrically connecting the power connector and the power transmission unit to transmit the power.

3. The system according to claim 1, wherein the release lever and the hook form a detachable connection by an elastic leg.

4. The system according to claim 1, wherein the cable module further comprises a tensioner wound with the power cable and configured to form the tension by winding or unwinding the power cable through the interval change.

5. The system according to claim 4, wherein the tensioner comprises:
    a rotary body wound with the power cable and configured to be rotated to wind or unwind the power cable;
    a fixed body having a center shaft onto which the rotary body is fitted and configured to be rotated and a spring housing forming a concentric circle with the center shaft to form a spring space;

a cover fixed to the center shaft and configured to block a secession of the rotary body; and a return spring provided in the spring space and configured to restore the rotary body with an elastic force by rotation of the rotary body.

6. The system according to claim 5, wherein each of the rotary body and the cover forms a cable slit, and the power cable is configured to exit the tensioner through the cable slit.

7. The system according to claim 5, wherein the return spring comprises a coil spring.

8. A vehicle comprising:
a door having an inner space;
a door carrier panel provided in the inner space and connected to a holder bracket;
the smart glass connected to the holder bracket, wherein the smart glass is configured to receive an adjustable power or voltage; and
the wired power transmission system according to claim 1.

9. The vehicle according to claim 8, wherein the smart glass comprises a suspended particle device (SPD) film, a polyvinyl butyral (PVB) film, or an ethylene vinyl acetate (EVA) film.

10. The vehicle according to claim 8, wherein:
the power connector, the holder mounting bracket, and a tensioner are mounted on a wet side of the door carrier panel that is directed outdoors; and
the inverter is mounted on a dry side of the door carrier panel that is directed indoors; and
the power cable is configured to be drawn from the dry side to the wet side through a cable hole of the door carrier panel.

11. The vehicle according to claim 10, wherein the cable hole is sealed by a grommet penetrated by the power cable.

12. The vehicle according to claim 8, wherein the inverter is connected to an inverter controller, and wherein the inverter controller is configured to vary applied power or voltage through power control of the inverter.

13. The vehicle according to claim 12, wherein the smart glass comprises a suspended particle device (SPD) film, a polyvinyl butyral (PVB) film, or an ethylene vinyl acetate (EVA) film.

14. A wired power transmission system for a smart glass, the system comprising:
a connector module comprising a power connector connected to a holder bracket configured to fix the smart glass, the connector module being configured to transmit power to the smart glass;
an inverter configured to vary an applied voltage of the power to change the power or the voltage of the smart glass; and
a cable module electrically connecting the power connector and the inverter through a power cable and configured to maintain an electrical connection state by forming a tension of the power cable through an interval change between the connector module and the inverter, wherein the cable module comprises:
a holder mounting bracket electrically connecting the power connector and a cable end of the power cable, wherein the holder mounting bracket comprises:

a cursor configured to insert the power connector into a connector groove formed on a plate body; and
a lead frame comprising a frame body connected to a frame channel formed on the plate body and configured to connect the power connector and the cable end through a terminal provided on the frame body; and
a tensioner wound with the power cable and configured to form the tension by winding or unwinding the power cable through the interval change;
wherein the power connector is connected to the holder bracket by a release lever of the power connector and a hook of the holder bracket;
wherein the power connector includes a rectangular connector body fitted into a connector holder of the holder bracket, a wire terminal communicating with an inner space is formed at one end portion of the rectangular connector body, and the release lever having elasticity is provided on one side of the connector body;
wherein the cursor and the lead frame are fixed by screws; and
wherein one of the screws is located at a bottom portion of the lead frame on the side of a first terminal connector and another one of the screws is located at a top portion of the lead frame on the side of a second terminal connector.

15. The system according to claim 14, wherein the cursor comprises a holder grip on the plate body, and wherein the holder grip is connected to the holder bracket.

16. The system according to claim 14, wherein the lead frame comprises the first terminal connector at a first end portion of the frame body and the second terminal connector at a second end portion of the frame body, and wherein a first connection is provided between the first terminal connector and the power connector and a second connection is provided between the second terminal connector and the cable end.

17. The system according to claim 16, wherein the first connection between the first terminal connector and the power connector and the second connection between the second terminal connector and the cable end are configured to form electrical connections with the terminal.

18. The system according to claim 17, wherein electrical connection directions of the terminal are opposite to each other at the first terminal connector and the second terminal connector.

19. The system according to claim 16, further comprising a protection cap covering the second terminal connector.

20. A vehicle comprising:
a door having an inner space;
a door carrier panel provided in the inner space and connected to a holder bracket;
the smart glass connected to the holder bracket, wherein the smart glass is configured to receive an adjustable power or voltage; and
the wired power transmission system according to claim 14.

* * * * *